(12) United States Patent
Emer et al.

(10) Patent No.: US 6,493,741 B1
(45) Date of Patent: Dec. 10, 2002

(54) METHOD AND APPARATUS TO QUIESCE A PORTION OF A SIMULTANEOUS MULTITHREADED CENTRAL PROCESSING UNIT

(75) Inventors: Joel S. Emer, Acton, MA (US); Rebecca L. Stamm, Palo Alto, CA (US); Bruce E. Edwards, Belmont, MA (US); Matthew H. Reilly, Stow, MA (US); Craig B. Zilles, Middleton, WI (US); Tryggve Fossum, Northborough, MA (US); Christopher F. Joerg, Watertown, MA (US); James E. Hicks, Jr., Newton, MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/411,194

(22) Filed: Oct. 1, 1999

(51) Int. Cl.$^7$ .................................................. G06F 9/48

(52) U.S. Cl. ....................... 709/107; 709/102; 710/200; 711/151; 712/228

(58) Field of Search ................................ 709/102, 107; 712/228; 711/151; 710/200

(56) References Cited

U.S. PATENT DOCUMENTS

| | | | | |
|---|---|---|---|---|
| 5,524,247 | A | | 6/1996 | Mizuno ....................... 710/200 |
| 5,546,593 | A | * | 8/1996 | Kimura et al. .............. 712/228 |
| 5,790,851 | A | | 8/1998 | Frank et al. ................. 709/104 |
| 5,872,963 | A | * | 2/1999 | Bitar et al. .................. 712/233 |
| 5,937,187 | A | * | 8/1999 | Kosche et al. .............. 709/104 |
| 5,961,584 | A | * | 10/1999 | Wolf ........................... 709/103 |
| 6,256,659 | B1 | * | 7/2001 | McLain, Jr. et al. ........ 709/100 |

OTHER PUBLICATIONS

Tullsen, D.M., et al., "Exploiting Choice: Instruction Fetch and Issue or an Implementable Simultaneous Multithreading Processor," Paper Presented at the Proceedings of the 23$^{rd}$ Annual International Symposium on Computer Architecture, Philadelphia, PA, (May 1996).

Lo, J.L., et al., "Converting Thread–Level Parallelism to Instruction–level Parallelism via Simultaneous Multithreading," Version of this Paper to appear in ACM Transactions on Computer Systems, pp. 1–25 (Aug. 1997).

Tullsen, D.M., et al., "Supporting Fine–Grained Synchronization on a Simultaneous Multithreading Processor," UCSD CSE Technical Report (CS98–587) and UW CSE Technical Report (UW–CSE–98–06–02) (Jun. 1998).

Tullsen, D. M. et al., "Simultaneous Multithreading: Maximizing On–Chip Parallelism," Paper Presented at the Proceedings of the 22$^{nd}$ Annual International Symposium on Computer Architecture, Santa Margherita Ligure, Italy (Jun., 1995).

Eggers, S. J. et al., "Simultaneous Multithreading: A Platform for Next–Generation Processors," IEEE Micro, pps. 12–19, (Sep./Oct. 1997).

* cited by examiner

*Primary Examiner*—Kenneth S. Kim
(74) *Attorney, Agent, or Firm*—Hamilton, Brook, Smith & Reynolds, P.C.

(57) ABSTRACT

Execution of a program's instructions in a simultaneous multithreaded processor is halted while the program is waiting for one or more events to occur by first arming an event monitor upon an arm instruction, that is, identifying to the event monitor one or more events to be monitored, such as a modification to a value or state of an identified memory location or group of locations, and setting a watch flag to indicate enable the event monitor. Upon execution of a quiesce request instruction, the program quiesces if the watch flag is set, and a timer is started. Upon observation by the event monitor of an identified event, or upon expiration of the timer, the watch flag is cleared and execution of the program resumes.

60 Claims, 9 Drawing Sheets

METHOD AND APPARATUS TO QUIESCE A PORTION OF A SIMULTANEOUS MULTITHREADED CENTRAL PROCESSING UNIT

BACKGROUND OF THE INVENTION

A "thread" is a stream of instructions being executed by a processor. Software that is multithreaded has multiple threads of control that cooperate to perform a task.

A simultaneous multithreaded (SMT) central processor unit (CPU) provides, on a single CPU, the capability of executing instructions from multiple threads simultaneously.

On a simultaneously-multithreaded processor, the hardware provides facilities for executing multiple threads as if each thread were executing on its own CPU. This abstract thread processor is called a thread processing unit, or TPU. To the outside world, a TPU has all the capabilities of a conventional CPU. It holds a full process context while a process or thread is executing on that TPU. The term "processor" is used herein to refer either to a TPU or a conventional CPU.

For example, a 4-way issue CPU might have two functional units executing instructions from one thread, while the other two functional units are executing instructions from an unrelated thread. This is accomplished by providing enough registers and other process-specific resources on the CPU to support as many threads as can run simultaneously, and then choosing among the threads to determine which specific instructions will be executed. The threads may be related, where they are cooperatively doing work, or they may be entirely unrelated.

FIG. 1 compares sample execution sequences for superscalar, multithreading, and simultaneous multithreading architectures. Each row represents the issue slots for a single execution cycle: a filled box indicates that the processor found an instruction to execute in that issue slot on that cycle. An empty box denotes an unused slot. The unused slots can be characterized as horizontal or vertical waste. Horizontal waste occurs when some, but not all, of the issue slots in a cycle can be used. It typically occurs because of poor instruction-level parallelism. Vertical waste occurs when a cycle goes completely unused. This can be caused by a long latency instruction, such as a memory access, that inhibits further instruction issue.

Sequence (a) 2 corresponds to a conventional superscalar. As in all superscalars, it is executing a single program, or thread, from which it attempts to find multiple instructions to issue each cycle. When it cannot, the issue slots go unused, and both horizontal 3A and vertical waste 3B are incurred.

Sequence (b) 4 corresponds to a multithreaded architecture. Multithreaded processors contain hardware state, i.e., a program counter and registers, for several threads. On any given cycle, a processor executes instructions from just one of the threads. On the next cycle, it switches to a different thread context and executes instructions from the new thread. The primary advantage of multithreaded processors is that they better tolerate long-latency operations, effectively eliminating vertical waste. However, they cannot removed horizontal waste. Consequently, as instruction issue width continues to increase, multithreaded architectures will ultimately suffer the same fate as superscalars: they will be limited by the instruction-level parallelism in a single thread.

Sequence (c) 6 corresponds to a simultaneous multi-threaded architecture and shows how each cycle in an SMT processor selects instructions for execution from all threads. It exploits instruction-level parallelism by selecting instructions from any thread that can potentially issue. The processor then dynamically schedules machine resources among the instructions, providing the greatest chance for the highest hardware utilization. If one thread has high instruction-level parallelism, that parallelism can be satisfied; if multiple threads each have low instruction-level parallelism, they can be executed simultaneously to compensate. In this way, SMT can recover issue slots lost to both horizontal and vertical waste.

Simultaneous multithreading is advantageous because it allows the CPU to get better throughput. Resources which would lie idle due to limited parallelism in one thread can be utilized by other threads.

A software program can be compiled, or decomposed, into multiple threads, with the purpose of achieving improved performance through parallel execution of those threads. The threads may be executed on different processors in a multiprocessor, or they may be executed on different thread processing units within an SMT CPU.

When programs are multithreaded in this way, locking protocols are used to control access to shared data. Assigning a special memory location, called a lock, to a section of data, controls access to that section of data. A thread can only update the data when it owns the lock.

An integral part of many locking protocols is a busy wait loop, often referred to as a "spin lock." In a spin lock, a process loops, looking at a particular memory location, i.e., the lock, and waiting for it to change to a specific value before proceeding. Once the value has changed, the process is then free to attempt to obtain the lock via an atomic update of the location

SUMMARY

In a conventional multiprocessor, the CPU resources and memory bandwidth consumed by a task in a spin lock are not simultaneously shared with any other tasks. Thus, while the task is spinning there is no resource contention within the CPU, and no reason not to let the task spin. Various studies have shown that approximately 15% of processor time is spent in spin loops.

In a simultaneous multithreaded CPU, however, the resources consumed by the spinning task are being denied to the other threads that are or could be doing useful work. In fact, Applicants have found that under these circumstances, the simultaneously multithreaded CPU provided no performance increase to the decomposed application, and can actually degrade the performance of the application.

One multithreaded computer uses fine-grained multithreading, which is different from SMT, and addresses the synchronization problem with a hardware retry which traps the thread after some number of failures and deschedules it. This is described in "Exploiting Heterogeneous Parallelism on a Multithreaded Multiprocessor," 1992, which can be found at web site tera.com/www/archives/library/psdocs.html.

U.S. patent application Ser. No. 08/775,553 by Emer et al, "A Multi-threaded Processor and Method That Selects Threads Based On An Attribute," (name amended in February, 1999), filed Dec. 31, 1996, assigned to a common assignee as the present invention and incorporated by reference herein in its entirety, describes an SMT architecture.

Many papers have been published about Simultaneous Multithreading. For a fairly complete list, see web site cs.washington.edu/research/smt/. The University of Washington has done much work on efficient synchronization on SMT. See, for example, "Supporting Fine-Grained Synchronization on a Simultaneous Multithreading Processor," 1995, available at web site cs.washington.edu/research/smt/papers/hpca.ps. A longer version of the paper, UCSD CSE Technical Report #CS98-587, is available at web site cs.washington.edu/research/smt/papers/smt.synch.ps.

These papers propose a synchronization "lock-box" mechanism which has the primary goal of providing faster synchronization between threads. The lock itself is memory-based, but once the lock is obtained by a thread on a particular CPU, the lock-box passes the lock among the threads on that CPU, if they require it. If a thread fails to acquire a lock and must wait for it to become available, the thread's instructions are flushed from the pipeline to prevent that thread consuming resources on the CPU. The mechanisms of synchronizing and possibly flushing the instructions are combined into one "Acquire" instruction, and all actions required by that instruction are carried out strictly in hardware.

U.S. Pat. No. 5,524,247 is a software patent on scheduling to avoid locks. It does not involve hardware and it is not related to SMT architecture.

The present invention resolves the problem of spin-lock in an SMT architecture by halting, or "quiescing," spin-locking threads while they are waiting for some event, i.e., the availability of a lock.

In accordance with an embodiment of the present invention, a method for halting execution of a program's instructions while the program is waiting for one or more events to occur in a simultaneous multithreaded processor or multiprocessor environment includes arming an event monitor associated with the program by identifying one or more events to be monitored. Each thread preferably has its own event monitor.

An event may be, for example, a modification to some identified memory location or group of locations, such as a change of access state or a change of value stored in the location. A change of access state may be, for example, from shared to exclusive. Such an event is typically caused by another program.

A change of value can be observed by monitoring a memory bus. In one embodiment, a write to the identified memory location, rather than observing a change in actual value stored therein, is sufficient to recognize the event.

The expiration of a timer is another example of an event that may be monitored.

Preferably, the arming of an event monitor is performed by executing an arm instruction which identifies the memory location to be monitored. The physical address of the memory location is recorded in a working register associated with the program, and an indicator such as a flag is set to a first state which enables the event monitor to monitor for the event. The indicator is set to a second state if a change to the memory location whose address is recorded in the working register is observed by the event monitor. Preferably, a lock value is loaded from the identified memory location by the same arm instruction.

The method further includes requesting, by executing a quiesce instruction after executing the arm instruction, that the program be halted until the event is observed by the event monitor. There is no requirement that the program be halted. However, if execution of the program is halted, the event monitor monitors for the event. Subsequent to observation of the event by the event monitor, but not necessarily immediately after, execution of the program is resumed.

Preferably, it is the responsibility of the program to check whether the event has occurred when the program resumes execution from the quiescent state. Thus, to ease implementation, hardware is permitted to release a thread from its quiescent state occasionally even if the event has not occurred.

After requesting that the program be halted, i.e., the indicator has been set to the first state, its execution is halted, if at all, only if the event has not yet occurred since the arming. If the indicator is set to the second state, the program is not halted in response to the request to halt.

Preferably, upon halting execution of the program, program instructions subsequent to the quiesce instruction are flushed from the instruction pipeline.

To allow for a quick restart when execution of the quiesced program or thread resumes, while the program is halted, program instructions are fetched into an instruction buffer and allowed to propagate into the instruction pipeline. The instruction buffer could be managed in various ways. For example, the percentage or absolute number of the thread's instructions allowed into the buffer could be limited, or different instruction buffers could be allocated to different threads.

Preferably, upon halting execution of the program, a timer associated with the program is set to time a predetermined time interval, and started. If program execution has not been resumed for other reasons, for example if the monitored event has not yet occurred, program execution is resumed upon expiration of the time. Preferably, the timer is stopped if execution of the program is resumed due to observation of the event by the event monitor.

Halting execution of, or quiescing, the program results in a reduction of power consumption, and allows other executing programs to utilize available resources.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

In a simultaneous multithreaded CPU, the resources consumed by a spinning task are being denied to the other threads that are doing useful work. Thus it is desirable to prevent the task in the spin lock from consuming resources when there is no chance that it will find the lock value it is looking for. Applicants refer to the action of pausing execution of a thread until the condition it is waiting for might be satisfied as "quiescing" the thread. In a simultaneous multithreaded machine, the act of quiescing means that no instructions are executed from the quiesced "thread processing unit" or TPU. The other TPUs continue normally.

The present invention allows an SMT processor to execute more useful instructions per processor cycle, than would an SMT processor without a quiescent state, resulting in improved overall processor performance.

Applicants' simulation results show that, using the quiescent state of the present invention, decomposed programs are executed from 1.1 to 2.5 times faster than the equivalent single-threaded program. Other runs done without a quiescent state showed no speedup at all, or even degraded in performance.

In one embodiment, two variations of the arm instruction are implemented. LDL_ARM loads a sign-extended longword from memory to a register and arms the event monitor. LDQ_ARM loads a quadword from memory to a register and arms the event monitor. These are herein referred to collectively as LDx_ARM.

QUIESCE is a conditional instruction, i.e., a request to quiesce, or halt, execution of the thread executing the QUIESCE.

These instructions, to be used in sequence, LDx_ARM followed by QUIESCE, allow a processor to declare that it has no work to do until some other processor writes a specified location in memory space.

Figure 1:
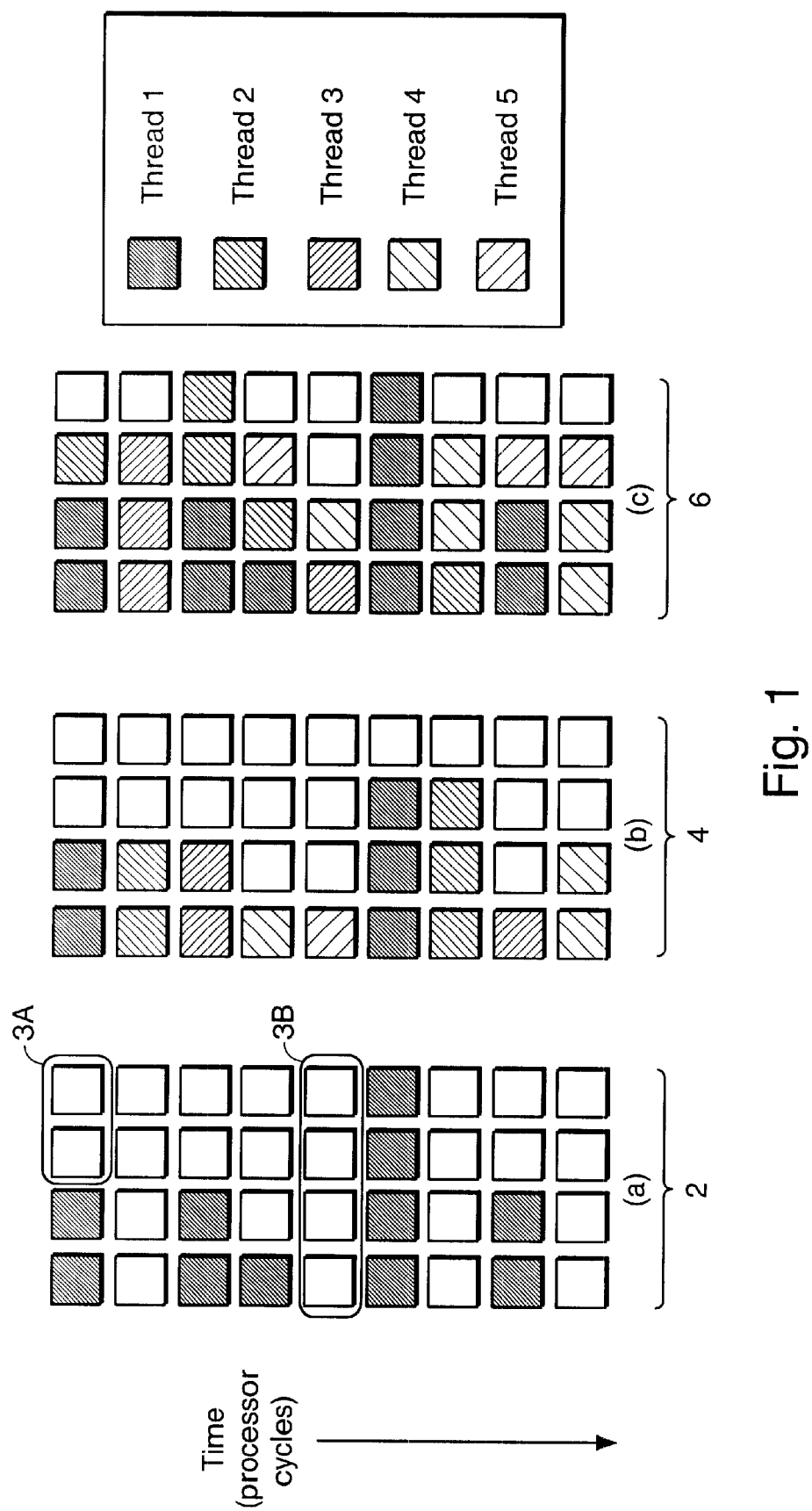
FIG. 1 is a schematic diagram comparing sample execution sequences for three different architectures.
Figure 2:
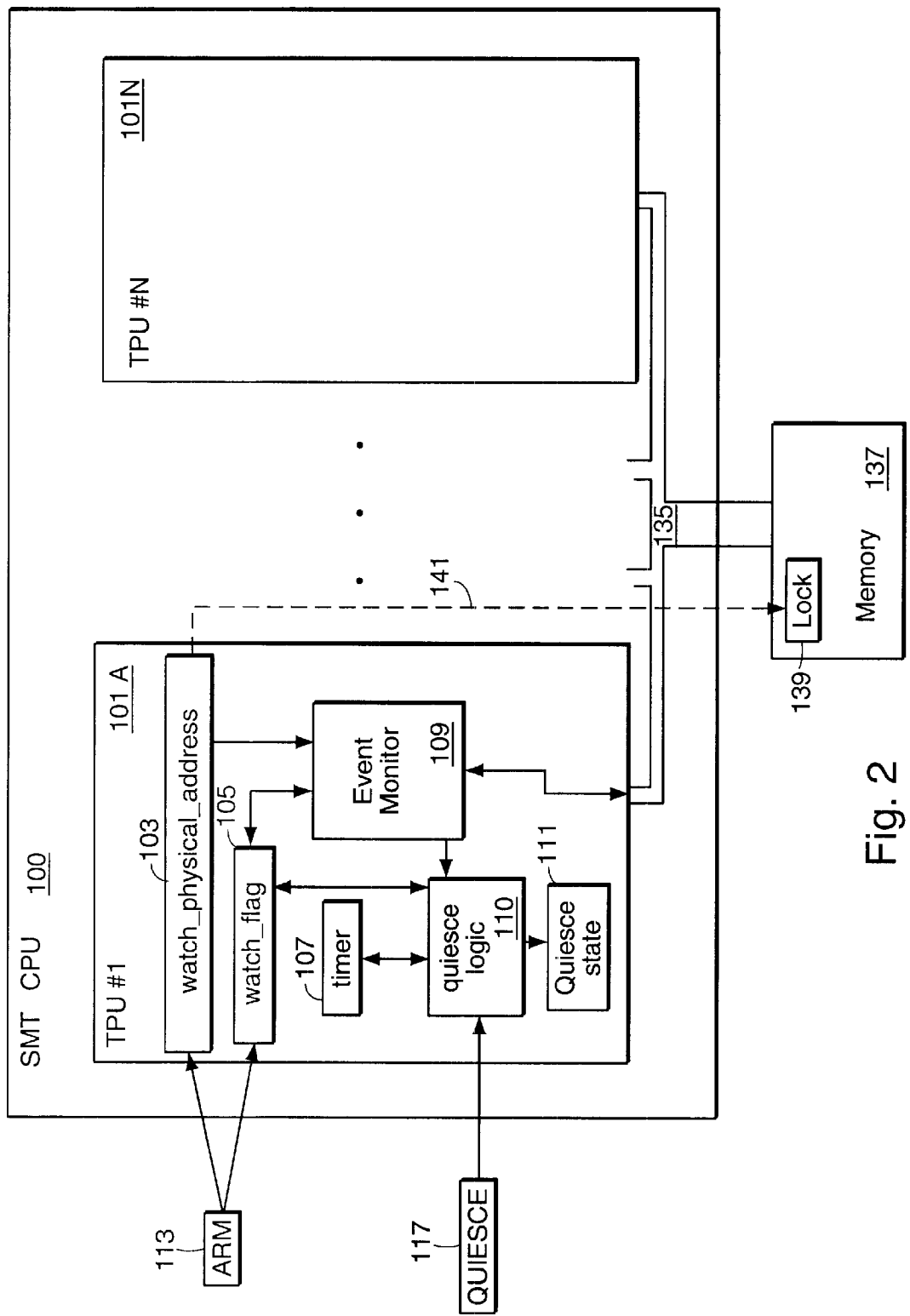
FIG. 2 is a block diagram of a preferred embodiment of the present invention.

FIG. 2 is a block diagram of a preferred embodiment of the present invention. A SMT CPU 100 can execute several threads simultaneously. While a TPU is somewhat abstract, there are definite physical components which belong to each TPU. Here, the CPU 100 comprises multiple TPUs, of which two, TPU #1 101A and TPU #N 101N, are shown. Only the details of TPU #1 101A are shown, for demonstrative purposes. Bus 135 connects the various TPUs to the memory 137.

Each TPU has an event monitor 109 to monitor for events identified in an event identification register 103. In a preferred embodiment, this event identification register 103 is a watch_physical_address register which holds the address of a lock 139 located in memory 137, as indicated by dashed arrow 141. The lock address is loaded into the event identification register 103 upon execution of an arm instruction 113. At the same time, an "armed" watch_flag indication 105 is set to a state to indicate that the event monitor 109 is now armed, and the event monitor 109 begins monitoring for the identified event.

Upon execution of a quiesce request instruction 117, quiesce logic 110, or execution scheduler, starts a quiesce timer 107, and if the armed indication 105 is set, i.e., the event monitor 109 is armed, the quiesce logic 110 sets the TPU's state 111 to quiesce mode, that is, the TPU 101A is quiesced.

Upon observation of the event by the event monitor 109, for example, a change to the lock 139 referenced in the event identification register 103, the event monitor clears the armed indication 105 and notifies the quiesce logic 110 which sets the TPU's state 111 to a non-quiesce mode, that is, the TPU resumes execution. Note that even if the TPU had not quiesced, observation of an identified event by the event monitor 109 will clear the armed indicator 105. Note also, that although not shown, expiration of the timer could be an identified event for which an event monitor could be armed.

Figure 3:
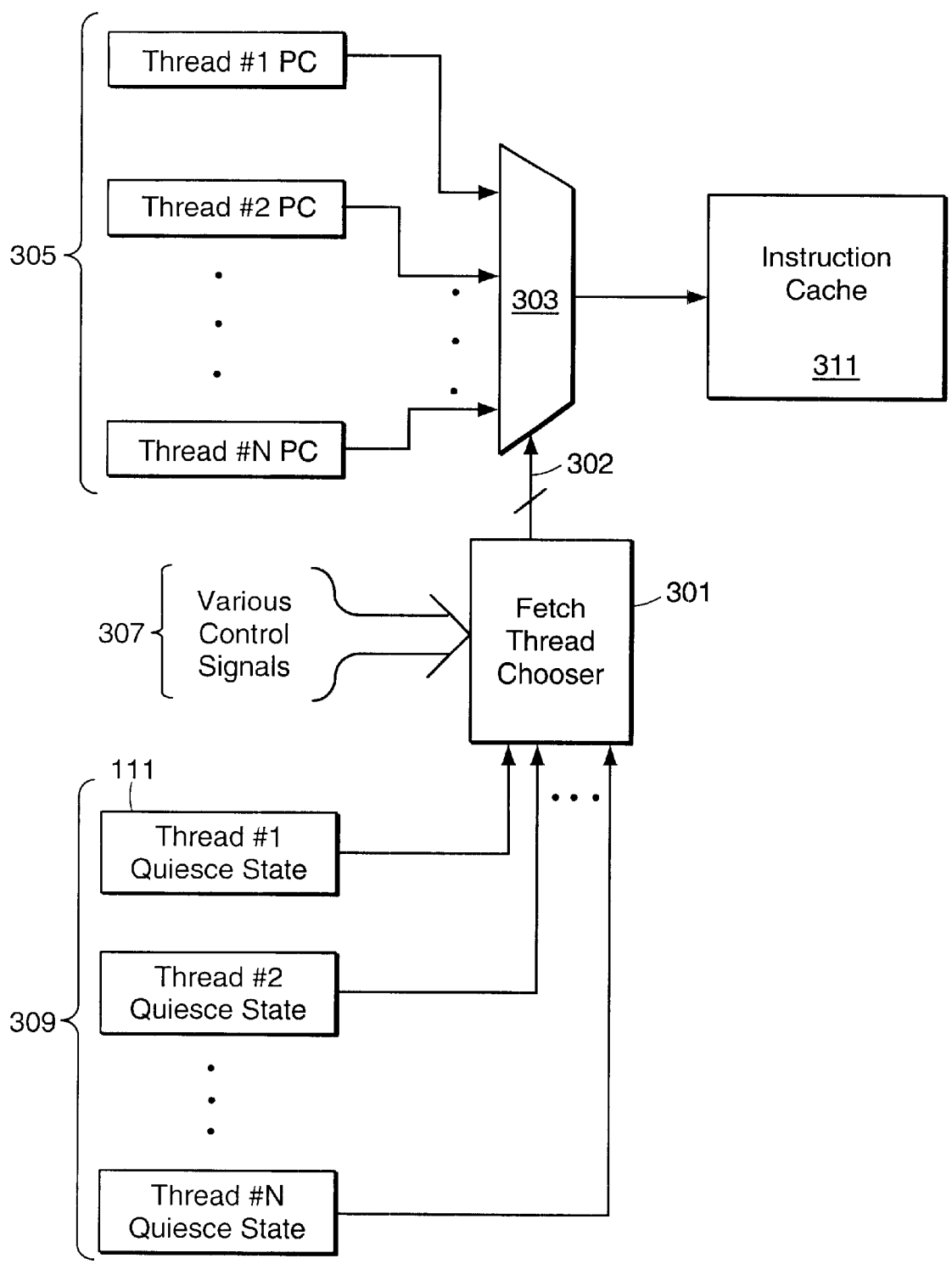
FIG. 3 is a schematic diagram illustrating the operation of a fetch thread chooser of a preferred embodiment of the present invention.

FIG. 3 is a schematic diagram which illustrates the operation of a fetch thread chooser or selection circuit of a preferred embodiment of the present invention. Each TPU or thread has a corresponding program counter (PC) 305, which indicates, for the TPU, the next instruction to be fetched from an instruction cache 311. A fetch thread multiplexor 303 selects from the PCs 305 and passes the selected PC on to the instruction cache 311.

The fetch thread multiplexor 303 selects a thread PC based on control signals 302 generated by a fetch thread chooser 301. Based on the quiesce states 309 of each thread, as well as various other control signals 307, the fetch thread chooser 301 selects a thread.

In one embodiment, the fetch thread chooser 301 selects only PCs associated with non-quiescent threads. Alternatively, the fetch thread chooser 301 may select a PC corresponding to a quiescent thread based on availability of unused instruction buffer space allocated to that thread.

Figure 4:
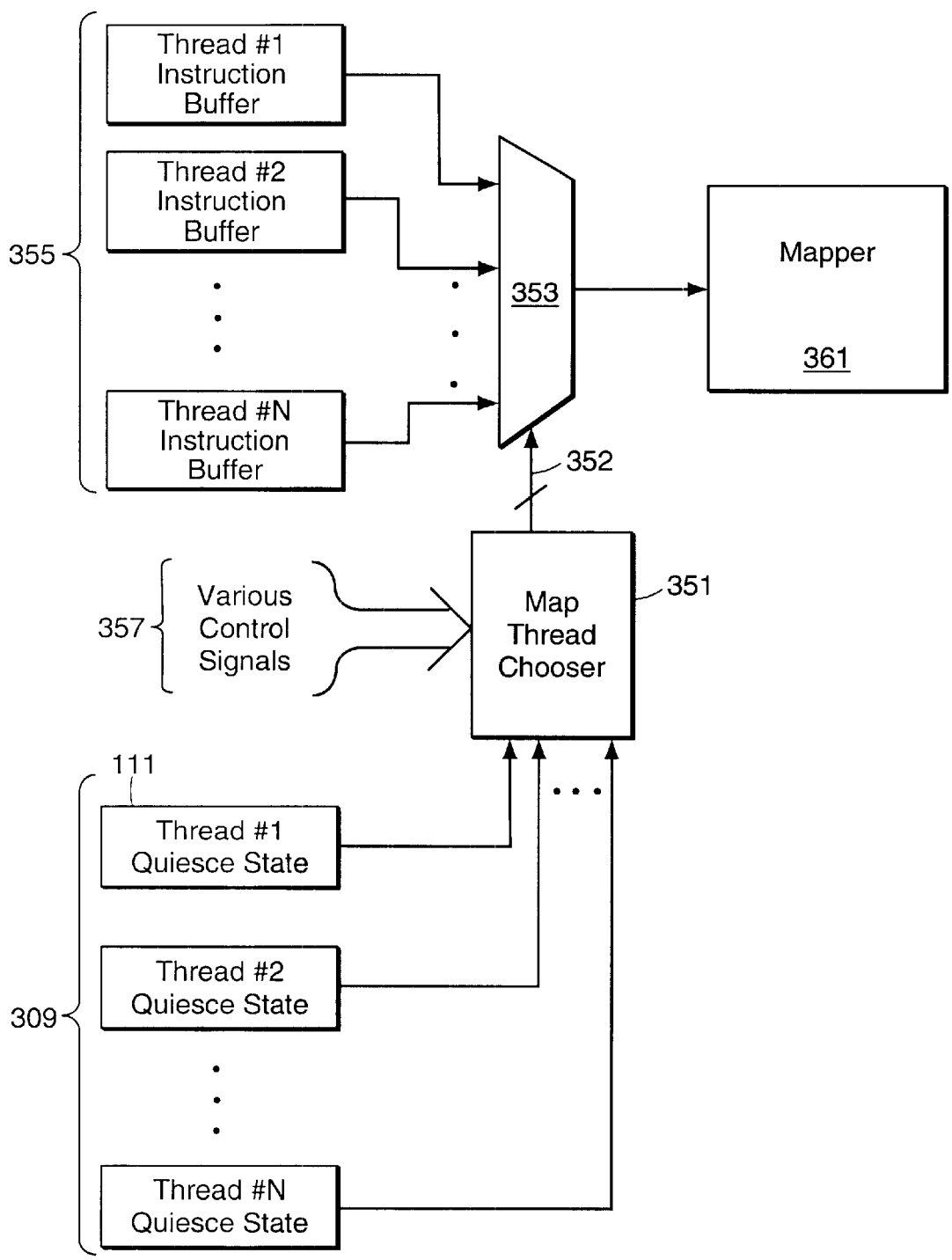
FIG. 4 is a schematic diagram illustrating the operation of a map thread chooser of a preferred embodiment of the present invention.

FIG. 4 is a schematic diagram illustrating a preferred operation of a map thread chooser or selection circuit, similar to that of the fetch thread chooser described above. As shown, each TPU or thread has an instruction buffer 355. In practice, a single buffer may hold instructions for all executing threads, where certain portions of the buffer are allocated for certain threads, or alternatively, where the thread instructions are interspersed within the buffer and identified with their threads.

A map thread multiplexor 353 selects from the buffers 355 and passes instructions from the selected buffer on to a mapper 361, which maps a "virtual" register named in an instruction to a physical register on the CPU. The map thread multiplexor 353 selects from a thread based on control signals 352 generated by a map thread chooser 351. Based on the quiesce states 309 of each thread, as well as various other control signals 357 which may comprise some or all of the same control signals 307 of FIG. 3, the map thread chooser 351 selects a thread.

The map thread chooser 351 selects only instructions from threads which are in a non-quiescent state.

Here is an example code sequence:

| Line 1: | LDQ_ARM R1, (R5) |
| Line 2: | <branch to GetLock if lock available)> |
| Line 3: | QUIESCE |
| Line 4: | GetLock: |

In this example, the virtual address of the lock 139 is held in register R5. At line 1, LDQ_ARM computes the lock's physical address from the contents of register R5, records that physical address in the event identification register 103, i.e., the watch_physical_address register, and loads the lock value from the physical address in memory into register R1. At this time the hardware also sets the armed, or watch_flag, indication 105, and the event monitor 109 monitors for a change to the memory location recorded in watch_physical_address. If any such change is observed, watch_flag is cleared.

Figure 5:
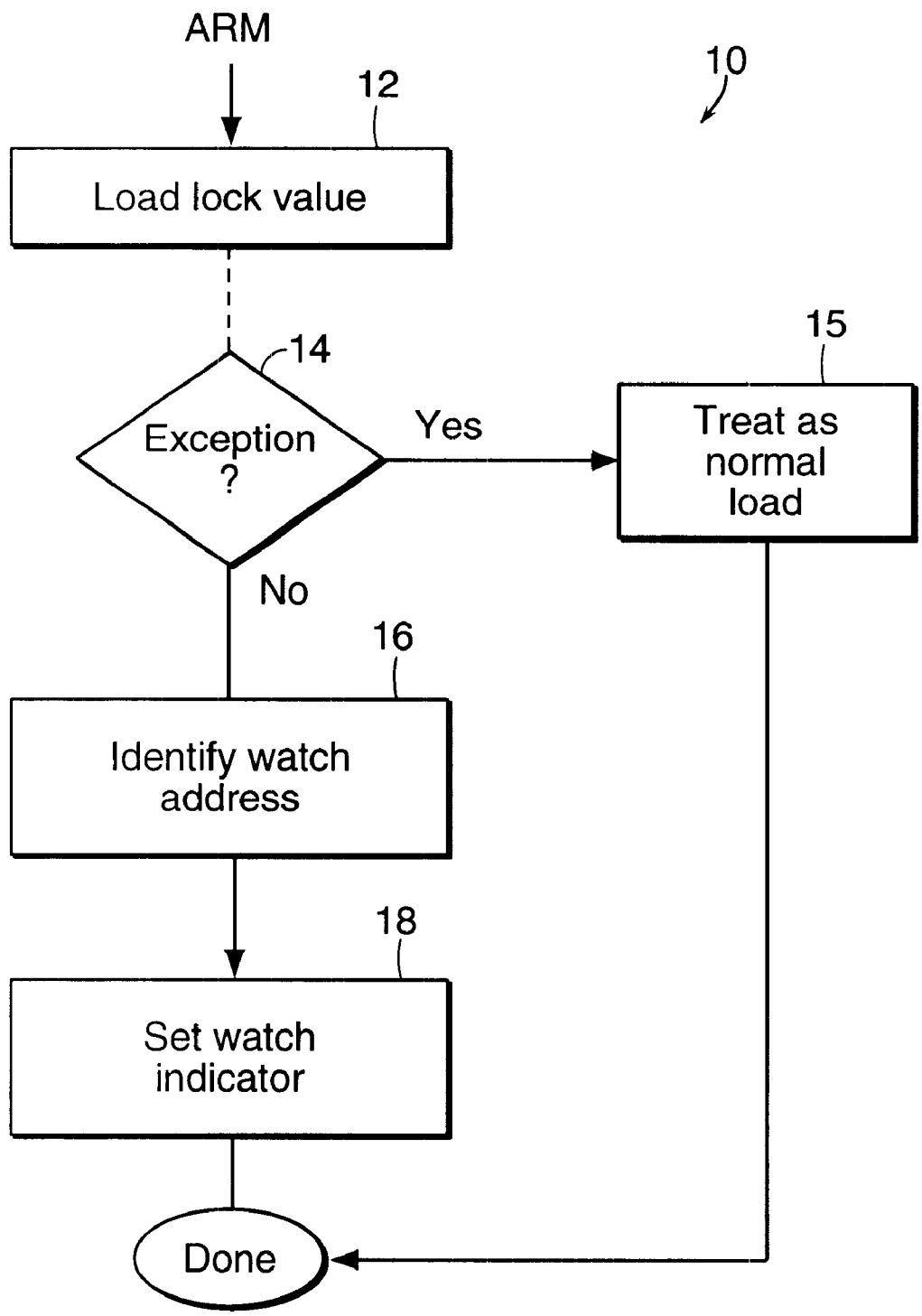
FIG. 5 is a flowchart demonstrating the execution of the arm instruction of a preferred embodiment of the present invention.

FIG. 5 is a flowchart 10 illustrating the operation of the LDx_ARM instruction. A preferred format of the instruction is "LDx_ARM Ra, (Rb)." The virtual address of the memory location, i.e., the lock 139 (FIG. 2), to be monitored by the event monitor 109 is in register Rb, where Rb is some designated register. The value stored in the lock is read and loaded into the register designated by Ra.

The lock value is fetched from memory, sign-extended for LDL_ARM, and written to register Ra (step 12). If the LDx_ARM instruction encounters an exception (Step 14), it is treated just as a normal load instruction (Step 15).

When a LDx_ARM instruction is executed without faulting, the processor records the target physical address in a per-processor watch_physical_address register (step 16) and sets the per-processor watch_flag (step 18).

Executing a LDx_ARM on one TPU does not affect any architecturally visible state on another TPU, and in particular cannot clear another TPU's watch_flag, causing the quiescing processor to come out of a quiescent state. Without this restriction, two processors executing LDQ_ARM/QUIESCE sequences could be continually re-arming each other.

Referring again to the above example code sequence, the program, at line 2, then tests the value of the lock to see if it is available. If so, the program branches away to GetLock where it will attempt to get the lock. If not, the program continues to line 3.

At line 3, the QUIESCE instruction is executed. If watch_flag is still set, the TPU ceases executing instructions from the program, i.e., it quiesces. If not, execution continues immediately at line 4.

If the program does quiesce, it stays in this quiescent state until the watch_flag 105 is cleared. This happens when some change occurs to the memory location recorded in watch_physical_address 103, but can also happen at the end of an implementation-specific timeout period, or for other implementation-specific reasons, and therefore, waking up is no guarantee to the program that an event identified for monitoring actually occurred.

One way of recognizing that a memory location has changed value in a multiprocessor is to observe that another TPU has changed the access state of the memory location, for example, from "shared" to "exclusive," while in the same CPU, hardware monitors the addresses on the write bus.

In a preferred embodiment, monitoring the identified memory location is simplified by using existing the cache-coherence protocol. That is, each cache block is in some state. For example, one state might be "read-shared," i.e., SHARED, wherein many processors have read access to any memory location in the block. Another state might be "writable," i.e., EXCLUSIVE, wherein only one processor has access to the block, and that is read and write access. Here, when some process or thread is in the writeable state, a quiescing process which is watching a memory location in the block wakes up, possibly before the actual write, but not before it can read the data. Thus, the quiescent processor wakes up, that is, it resumes executing its thread, by watching the state of a block, rather than the particular location.

Figure 6:
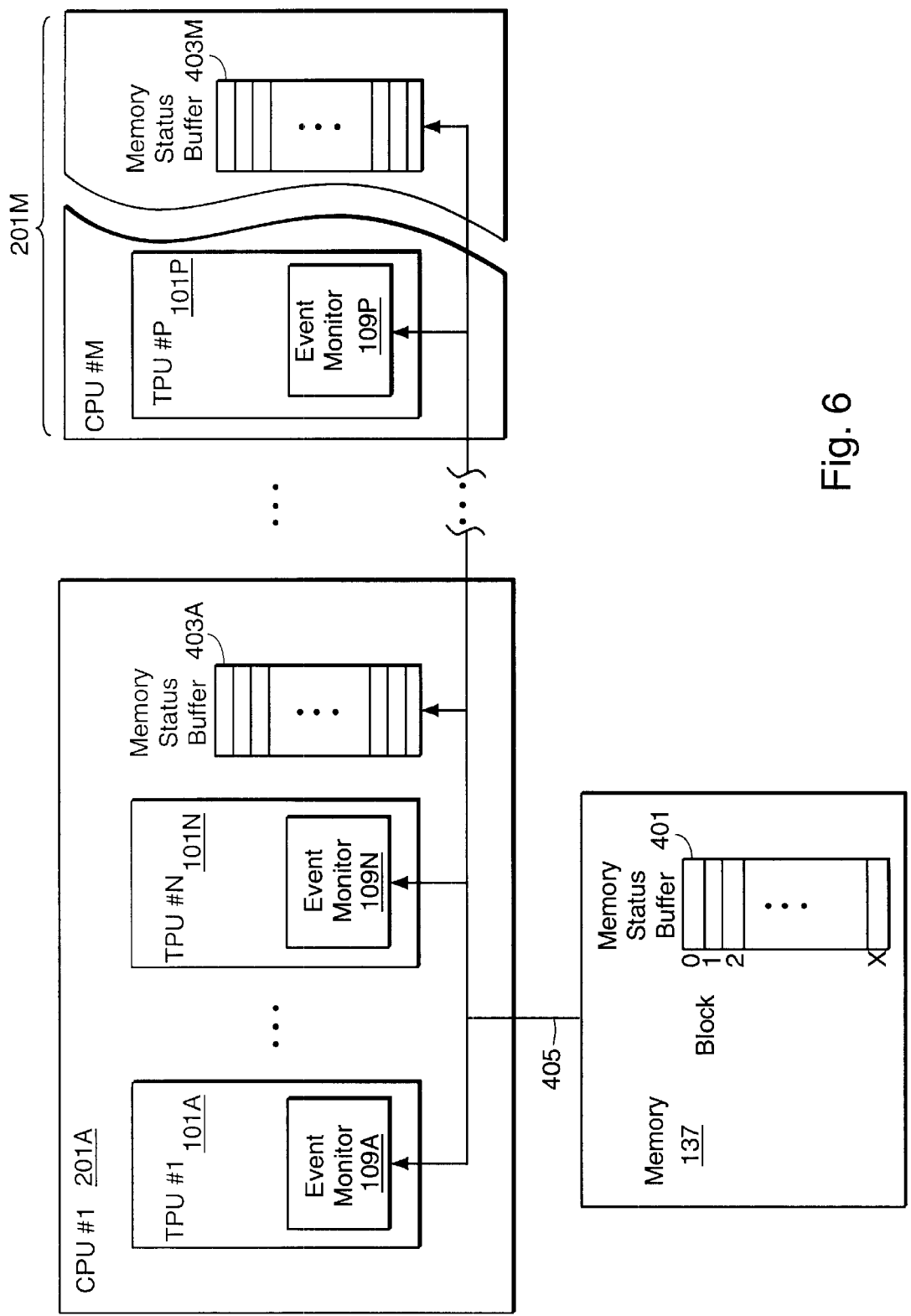
FIG. 6 is a schematic diagram illustrating an embodiment of the present invention in which the event monitor watches the status of an identified block of memory.

FIG. 6 is a schematic diagram illustrating an embodiment of the present invention in which the event monitor watches the status of an identified block of memory. Here, a multi-processor system is shown, comprising multiple CPUs 201A–201M. Though not necessary, for exemplary purposes, each CPU is an SMT CPU.

Each CPU 201A–201M has several TPUs (101A–101P shown). Each TPU has a respective event monitor 109A–109P.

The memory system 137 has a master memory status buffer 401, which indicates a status such as SHARED or EXCLUSIVE for each memory block. In addition, each CPU has a CPU-wide memory status buffer 403, which contains copies of the information in the master memory status buffer 401 pertinent to that CPU. When the status of a block of memory changes, a message is preferably sent out to those CPUs which need to know about the change, preferably over an inter-CPU messaging bus 405. The event monitor 109A–109P of this embodiment monitors the inter-CPU messaging bus 405. When the status of an identified block, or of a block containing an identified memory location or lock, changes to EXCLUSIVE, for example, the corresponding event monitor is triggered to reset the watch_flag indicator 105 and notify the quiesce logic 110 that the event has occurred.

Alternatively, hardware could watch address/data signals on the memory bus.

Figure 7:
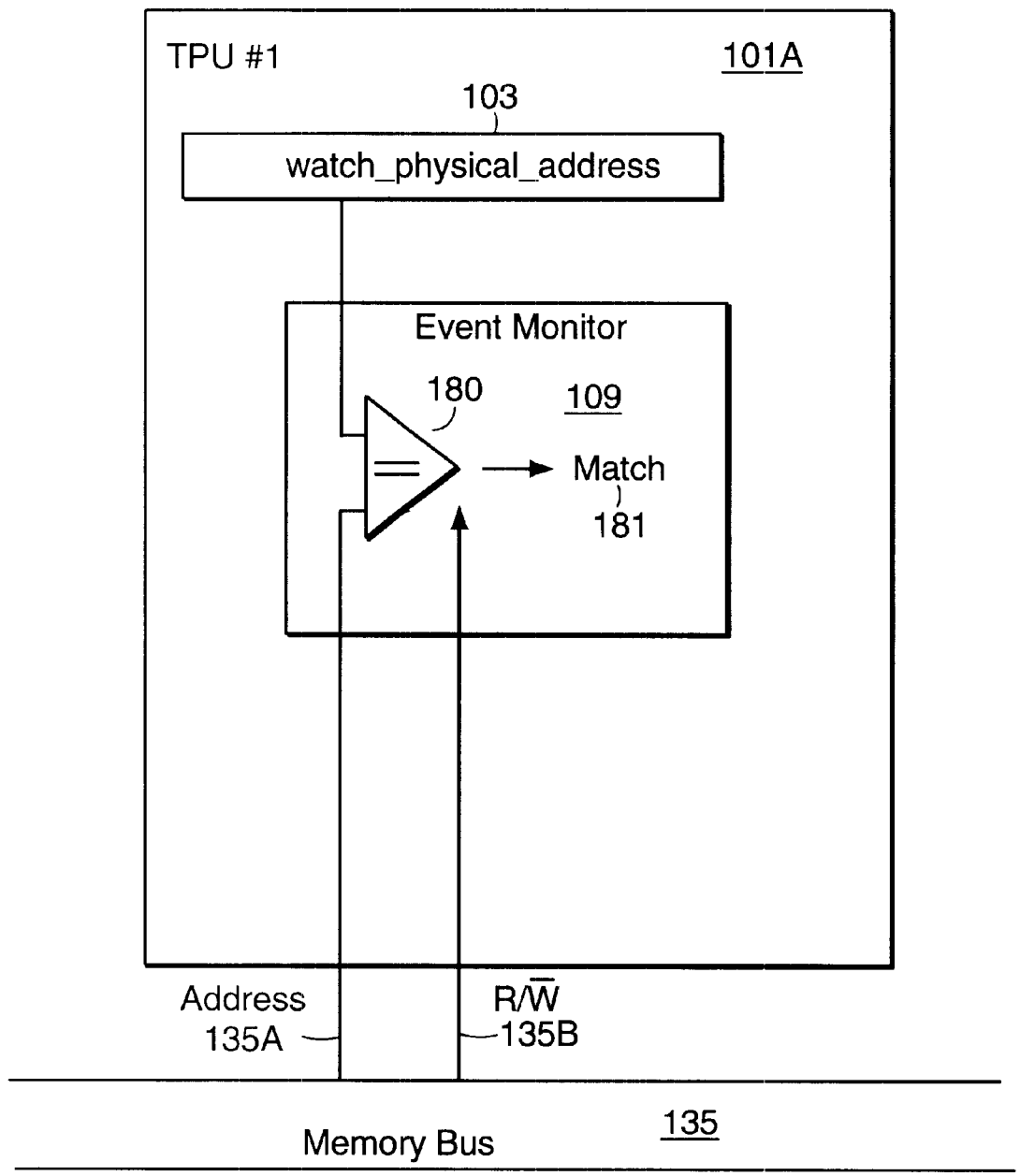
FIG. 7 is a schematic diagram illustrating an embodiment of the present invention in which the event monitor watches memory address and control lines.

FIG. 7 is a schematic diagram illustrating an embodiment of the present invention in which the event monitor 109 watches memory address lines 135A and control lines 135B. Comparator 180 compares the watch_physical_address 103 with the address on the memory bus 135 address lines 135A. The comparator 180 is only enabled for write operations, for example, when WRITE is asserted on a read/write control line 135B. The output 181 of the comparator 180 indicates whether a write to the identified location, i.e., the monitored event, has occurred.

Figure 8:
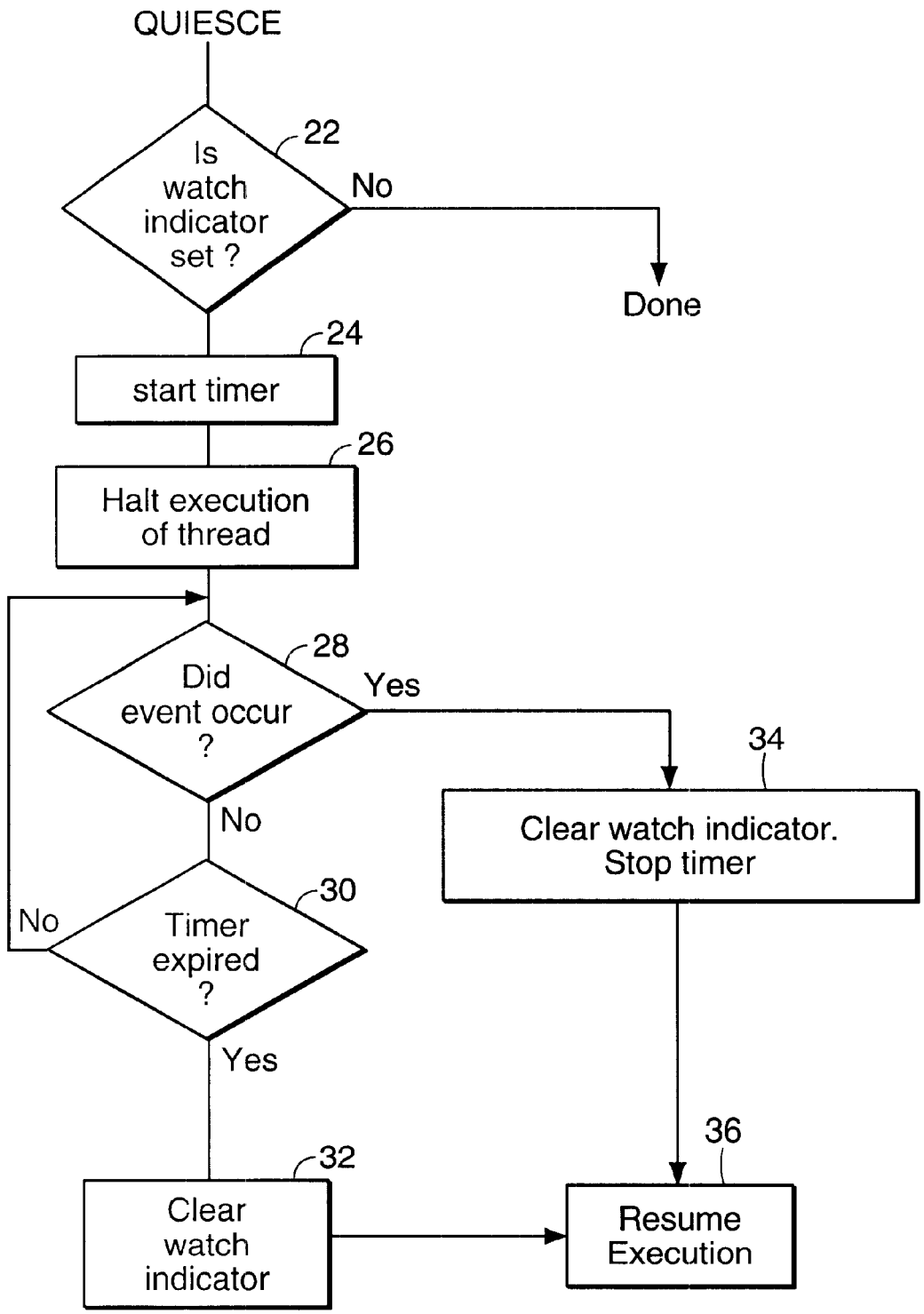
FIG. 8 is a flowchart demonstrating the execution of the quiesce instruction of a preferred embodiment of the present invention.

FIG. 8 is a flowchart 20 illustrating the operation of the QUIESCE instruction 117 of FIG. 2. The preferred format is simply "QUIESCE" with no parameters. The watch_flag indication 105 is checked in step 22, and if it is clear, nothing is done. Thus, the QUIESCE instruction is really a conditional quiesce, or a request to quiesce.

If, on the other hand, the watch_flag 105 is set, the implementation-specific quiesce timer 107 is set to time some implementation-specific finite period of time (step 24) and execution of the thread is halted 26, i.e., the TPU 101A is quiesced. An examplary period of time is between 10,000 and 100,000 machine clock cycles. For some quiescing threads, the timer is disabled.

The event monitor 109 now monitors the memory location identified in the watch_physical_address register 103. Alternatively, the event monitor may always be monitoring for the identified event, regardless of the state of the watch_flag indicator—it simply would take no action if the watch_flag were not set. If the event is observed (step 28), the watch_flag is cleared and the quiesce logic 110 notified. If the quiesce period ends before the quiesce timer 107 expires, the timer 107 must be stopped to prevent it clearing watch_flag after a future LDx_ARM. (step 34). Finally execution of the program is resumed.

On the other hand, if the event is not observed at step 28, the timer is monitored at step 30. If it has not expired, the program remains quiesced and the event monitor continues to monitor for the event at step 28. Note that, although steps 28 and 30 are shown sequentially in the flowchart of FIG. 8, they are performed by hardware and may in fact be performed in parallel. Finally, if the timer expires before the event is observed, the watch_flag is cleared (step 32) and again, program execution is resumed at step 36.

The quiesce timer 107 is useful and/or necessary for several reasons. First, the timeout enables the implementation of a backoff algorithm, where a process can deschedule itself after some period of time if it has not obtained the lock. Second, the timer prevents a processor from deadlocking if there is a coding error. Third, suppose the code updating the memory location 139 takes an access violation so that the lock is never unlocked. The quiesce timeout allows the waiting processor to wake up and discover the problem with checking code.

If a longer quiesce period is desired than that provided by a given hardware implementation, software can implement the longer period by looping and quiescing repeatedly.

After the quiescent period, execution resumes at the instruction following the QUIESCE, or, if the QUIESCE was terminated because watch_flag was cleared by an interrupt, execution may resume at an interrupt servicing routine.

In a preferred implementation, if an interrupt causes a processor to end a quiescent period and immediately start executing the interrupt servicing routine (ISR), that ISR may return to the QUIESCE instruction only if watch_flag is guaranteed to be clear. If it is not, the ISR must return to the instruction after the QUIESCE, since the value of watch_physical_address may have been changed by a LDx_ARM executed while servicing the interrupt.

In at least one embodiment, if an interrupt occurs during a quiescent period, the ISR does not have to be started immediately after the QUIESCE. The hardware may choose to delay execution of the ISR until some later point in the instruction stream.

A more detailed example code sequence using the quiesce operation follows. In this program, register R5 contains the address of a lock. The program is spin-locking on the lock until the lock holds the value 0. Register R0 is loaded with the value of the lock by the LDQ_L instruction.

quiesce needlessly. Having execution after the QUIESCE fall through into the CheckLock section allows the lock to be checked again, in case the quiescent state ended for some other reason than a change in the lock value, such as a timeout or interrupt. Note however, that for a lock which is highly contended, the "BEQ R0, GetLock" lines will mispredict when the lock is finally given up, assuming that the program quiesced multiple times before getting a chance at the lock. This mispredict will slow down the attempt to get the lock.

Note also that if the LDQ_ARM is executed and QUIESCE is not executed, because a branch is taken to get the lock, the watch_flag will still be set. It will continue to be set until it is cleared by one of the conditions given for clearing watch_flag. This should have no actual effect since the processor is not quiesced at the time. The fact that a processor's watch_flag is set when the event monitor is not actually watching for anything is harmless. The next LDx_ARM which executes will load a new watch_physical_address and set watch_flag whether or not it is already set. Thus, LDx_ARM and QUIESCE instructions need not be paired.

Figure 9:
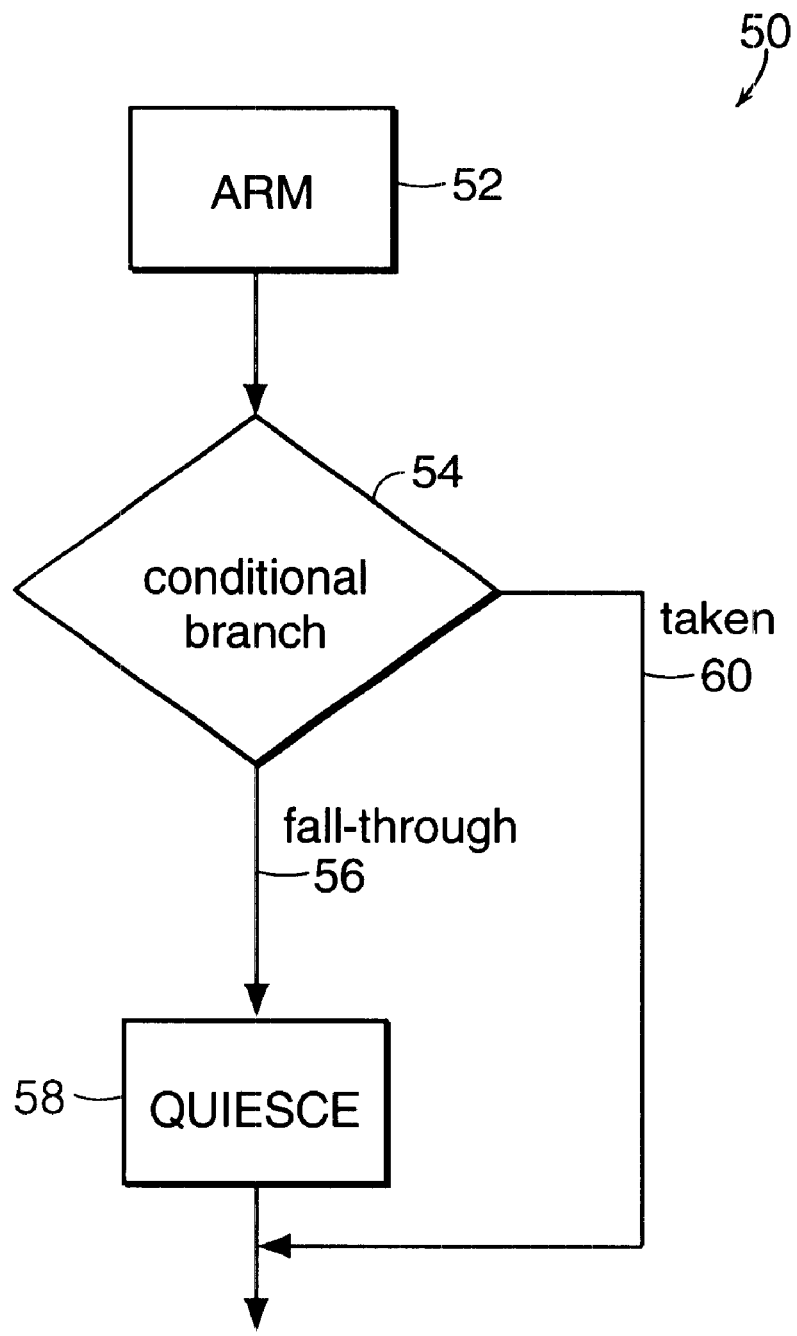
FIG. 9 is a flowchart demonstrating that a quiesce instruction does not need to follow an arm instruction.

The flowchart 50 of FIG. 9 demonstrates this concept. In particular, a LDx_ARM 52 may be followed by a conditional branch 54. On the fall-through path 56 a QUIESCE 58 is executed, whereas on the taken path 60 no matching QUIESCE is executed.

In some embodiment, the thread may fail to QUIESCE for a variety of reasons.

For example, if any other memory access is executed on the given TPU between the LDx_ARM and the QUIESCE, the TPU may always fail to quiesce on some implementations. Otherwise, a direct-mapped translation buffer could thrash. Or, the memory reference could change the contents of the cache upon which the implementation might depend.

Some instructions, such as floating-point instructions, executed between the LDx_ARM and the QUIESCE, may cause a TPU to always fail to quiesce on some implementations due to, for example, an Illegal Instruction Trap.

Similarly, if an instruction with an unused function code is executed between the LDx_ARM and and the QUIESCE,

```
GetLock:
    LDQ_L           R0, (R5)            ;load the lock value
    BNEQ            R0, HandleBusyLock  ;if not available, quiesce
    <modify R0>
    STQ_C           R0, (R5)            ;store new lock value if lock_flag still set
    BEQ             R0, GetLock         ;if store conditional failed, try again
    <critical section>                  ;we have the lock, now do the real work
    <clear lock>                        ;done
    RET
HandleBusyLock:
    LDA R2, 0x400(R31)                  ;set bit 10, SMT bit in AMASK
    AMASK R2, R2                        ;test whether SMT processor
    BEQ R2, CheckLock                   ;if no SMT, skip quiesce
    LDQ_ARM R0, (R5)                    ;load the lock value at address R5 into R0
                                        ;put lock address into watch_physical_address
                                        ;set watch_flag
    BEQ             R0, GetLock         ;if lock available, try to get it
    QUIESCE                             ;if watch_flag set, go quiet
CheckLock:
    LDQ             R0, (R5)            ;load lock value again
    BEQ             RO, GetLock         ;if available, try for it again
    <check for spinning on lock too long>
    BR HandleBusyLock                   ;loop again
```

In this code sequence, testing the lock just after the LDQ_ARM instruction is crucial to performance in the case where the lock is available—otherwise the code would on some implementations the TPU may fail to quiesce because an instruction with an unused function code is unpredictable.

The watch_flag and watch_physical_address register are loaded simultaneously with the reading of the value of the lock. If the lock value becomes unlocked before the QUIESCE is executed, watch_flag is cleared because the watched location has been modified, preventing the TPU from quiescing needlessly. Of course, if the watch_flag is not cleared due to the change in the lock, the quiescent timer will eventually time out and end the quiescent period.

Since watch_flag and watch_physical_address are implicity written by LDx_ARM and implicity read by QUIESCE, any speculative execution of those instructions must preserve the read-order and write-order of watch_flag and watch_physical_address, as intended in the original program.

For example, in the code sequence below, if the first branch is incorrectly predicted taken, the second LDxARM must not be allowed to affect the behavior of the first QUIESCE by changing watch_physical_address.

```
    LDQ_ARM R1, (R5)

BEQ RI, test

QUIESCE test:

LDQ_ARM R1, (R5)

BEQ R1, xxx

QUIESCE
```

When a TPU enters the quiescent state or mode, all instructions subsequent to the QUIESCE are flushed from the pipeline, the quiesce timer is started, and the QUIESCE instruction is retired. This is analogous to what happens on a branch mispredict. Instruction fetch restarts at the instruction after the QUIESCE instruction.

For quick restart, instructions from the quiesced thread are fetched and allowed to propagate into the pipeline up to the mapper. When execution restarts, the thread chooser that selects instructions from the buffer to be mapped and executed can immediately select from the previously-quiesced thread, without incurring the delay of fetching instructions from the instruction cache. Since instructions from the quiesced thread are not mapped, that thread does not consume valuable Inum space (Inums serve to identify "in-flight" instructions) or physical registers. Also, since instructions subsequent to the QUIESCE are no longer in the issue queue, the TPU does not consume execution resources after it quiesces.

In-order execution of LDx_ARM and QUIESCE is ensured through the defined dependency on watch_flag—LDx ARM sets it and QUIESCE uses it as a condition on its operation.

By having the LDx_ARM load the lock value so that code can test the lock before executing the QUIESCE, the possibility of a race between the lock just becoming available, and quiescing the machine is eliminated.

In a preferred embodiment, these instruction are assigned codes such that a program utilizing them is still be functional even when executed in older machines.

Preferably, opcodes for the arm and quiesce instructions are chosen such that they are memory format instructions, and appear as NOPs to earlier architectures.

By meeting these criteria, programs could be written using LDx_ARM/QUIESCE instructions without using AMASK to condition the code based on the processor type.

AMASK is an instruction which returns a value indicative of resources on a CPU, i.e., the CPU's architecture. Using the AMASK instruction, code which depends on the register value loaded by the LDx_ARM must execute an ordinary load before the LDx_ARM, to accomplish the load operation in the older machines.

Alternative Embodiments To The LDx_ARM/
QUIESCE Approach

As the preferred LDx_ARM/QUIESCE embodiment was being developed, a number of alternative embodiments were also considered, as discussed below.

1. Timer-based

In this embodiment, a QUIESCE instruction starts a timer and unconditionally quiesces, the timeout being the event upon which the event monitor wakes up the quiescing TPU. There is no arm instruction. This was found not to obtain satisfactory speedups in execution.

2. Unified QUIESCE Instruction: QUIESCE Ra, (Rb)

This embodiment also has no explicit LDx_ARM instruction. The QUIESCE instruction performs a load. If a QUIESCE is executed when the watch_flag is clear, it loads watch_physical_address, sets watch_flag and does not quiesce the processor. Thus, it acts as an LDx_ARM instruction.

If a QUIESCE is executed when the watch_flag is set, it does quiesce the processor. The processor stays quiesced until its watch_flag is cleared by a store to watch_physical_address.

For the "first" QUIESCE, the load data can be tested by subsequent instructions to find out if the lock is held. For a "second" quiesce, it is unclear what that load means or when it is loaded. It is preferable to load the lock value at the end of the QUIESCE period, to see what it has changed to, but this is very difficult to implement.

The advantage of this embodiment is that it requires just one instruction. However, it is more difficult to understand and implement. For example, as discussed above, there are two flavors of the instruction, a "first" and a "second." Furthermore, it is not clear how meaningful data would be returned to the second QUIESCE. Finally, specifying what can or cannot happen between QUIESCE instructions may be unmanageable.

3. Use of Architectural Registers to Enforce LDx_ARM/
QUIESCE Dependency.

In this alternative embodiment, LDQ_ARM is a load and QUIESCE is a store, of sorts. A sample code sequence would appear as follows:

```
    LDQ_ARM R0, (R5)       ; this is a load
    BEQ getlock
    QUIESCE R0, (R31)      ; this is a "store"
getlock:
```

Since the QUIESCE reads the value in register R0, the already-existing hardware in an out-of-order implementation will naturally keep the QUIESCE in-order with the LDQ_ARM, upon which it is dependent. The watch_physical_address and watch_flag registers are used as in the originally preferred embodiment discussed previously.

4. Add LDx_ARM Functionality to LDx_L

In this alternate embodiment, the LDx_ARM functionality is overloaded on the LDx_L instruction. Whenever a LDx_L is executed, the watch_physical_address and the watch_flag are set, in addition to the lock_flag and the lock_physical_address.

Alternatively, instead of having the watch_flag and watch_physical_address registers at all, the lock_flag and the lock_physical_address could be used both for LDx_L/STx_C functionality and for ARM/QUIESCE functionality. In this case, QUIESCE would watch for the clearing of the lock_flag. The same LDx_L would not be used both as the partner of a QUIESCE and the partner of a STx_C. If the watch register and indicator are used, LDx_ARM functionality could be specified using the low address bit of the LDx_L to specify ARM. If only the lock registers are used, no differentiation in the LDx_L instruction is needed.

The LDx_L ("load lock") and STx_C ("store conditional") instructions are described in pages 4–9 through 4–14 of "Alpha Architecture Handbook," Version 4, Compaq Computer Corporation, 1998, which is incorporated by reference herein in its entirety.

These approaches have the advantage that only one new instruction, QUIESCE, is needed. In addition, a code corresponding to a no-operation (NOP) instruction for earlier architectures, could be more easily selected for QUIESCE than for LDx_ARM instruction, providing backward-compatibility. Finally, LDx_L and LDx_ARM already share a lot of functionality, so implementation is relatively straightforward.

However, this does overload the LDx_L instruction, making code using the instruction more difficult to understand and verify. Furthermore, implementations would be restricted by requiring two functionalities. For example, LDx_L would not be able to request write privileges for a block, since it might be used in conjunction with a QUIESCE rather than a STx_C.

5. Define QUIESCE to be a load and Test.

In this alternate embodiment, the QUIESCE instruction loads a value, and the processor quiesces based on that value. A quiesce instruction formatted as "QUIESCE Ra, (Rb)" loads register Ra with the value stored in the memory address in register Rb. The thread quiesces if the value in Ra is non-zero, and is effectively a NOP if the value in Ra is a zero. The QUIESCE instruction also loads the watch-flag and the watch_physical_address.

Thus, the advantages of this approach are that LDx_ARM instructions are not needed, and therefore coding restrictions not needed, and only one instruction is needed to accomplish the functionality.

Unfortunately, it is too restrictive to have just one flavor of test, so different types of QUIESCE must be defined, just as there are many types of branches. In addition, this is a different type of instruction, requiring hardware to operate on load data, that is, data loaded from memory.

6. Define QUIESCE to be a read of Memory and Compare with a Register.

This embodiment uses QUIESCE as follows:

```
LDQ R0, (R5)
BEQ R0, getlock
QUIESCE R0, (R5)
``` getlock:

In this embodiment, the QUIESCE instruction in the above code sequence translates the virtual address in register R5 and reads the lock value from that physical address. It then compares that lock value with the contents of register R0, which was previously loaded by a standard load instruction (the LDQ instruction here) preceding the QUIESCE. If the two values are equal, the QUIESCE succeeds and the thread quiesces. If they are not equal, the QUIESCE has the effect of a NOP and does not quiesce the thread.

While the processor is asleep, i.e., quiescing, the hardware watches the physical address as calculated when the QUIESCE executed. This is analogous to the watch_physical_address register as defined in other instructions, but is entirely private to the hardware, that is, it is not visible to the software at all. The quiesce period ends if some write access occurs to that physical address.

One advantage of this approach is that a LDx_ARM instruction is not needed, and therefore, coding restrictions are not necessary. Only one instruction is needed to accomplish the functionality. Furthermore, the watch_flag and watch_physical_register do not need to be defined as internal processor registers.

On the other hand, this approach presents a very complicated instruction, unlike any other, requiring a load from memory, a read from a register, and a compare all in the one instruction. Such an instruction is difficult to implement by introducing a datapath completely unlike anything existing in the current Alpha architecture.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for temporarily halting execution of a thread of control while the thread of control is waiting for an event to occur, comprising:

arming an event monitor, via execution of an arm instruction, by identifying at least one event to be monitored;

requesting that the thread of control be halted until any such identified event is observed by the event monitor; and if execution of the thread of control has been halted, monitoring, by the event monitor, for an identified event; and resuming execution of the thread of control subsequent to observation of an identified event by the event monitor.

2. The method of claim 1, further comprising:

halting execution of the thread of control after requesting that the thread of control be halted if an identified event has not yet occurred since the arming.

3. The method of claim 1 wherein identifying an event to be monitored comprises identifying at least one memory location to be monitored by the event monitor, and wherein the event comprises a modification to any such identified memory location.

4. The method of claim 3 wherein the modification comprises a change of state.

5. The method of claim 4 wherein a change of state comprises a change of access state.

6. The method of claim 5 wherein a change of access state is from shared to exclusive.

7. The method of claim 5 wherein a change of access state is observed by monitoring an inter-CPU messaging bus.

8. The method of claim 4 wherein a change of state comprises a change of value.

9. The method of claim 8, wherein a change in value is observed by monitoring a memory bus.

10. The method of claim 8 wherein a change in value is observed as a write to the memory location.

11. The method of claim 1, wherein halting execution of the thread of control allows other executing threads to control to utilize available resources.

12. The method of claim 1, wherein execution of the arm instruction further comprises:
setting an indicator to a first state which enables the event monitor to monitor for the event, wherein the indicator is set to a second state if the event occurs.

13. The method of claim 12, wherein the arm instruction identifies an event to be monitored by
identifying at least one memory location; and
recording a physical address of an identified memory location in a working register associated with the thread of control.

14. The method of claim 13 wherein the indicator is set to a second state if a change to the memory location whose address is recorded in the working register is observed by the event monitor.

15. The method of claim 12 wherein, in response to a request to halt the thread of control, execution of the thread of control is halted if the indicator is set to the first state.

16. The method of claim 12 wherein execution of the thread of control is not halted in response to a request to halt the thread of control if the indicator is set to the second state.

17. The method of claim 13, wherein execution of the arm instruction further comprises:
loading a value from the identified memory location.

18. The method of claim 1, further comprising:
executing a quiesce instruction to request that the thread of control be halted.

19. The method of claim 18 wherein in the arm instruction and queue instruction are assigned machine codes such that a thread of control utilizing the arm and queue instructions is functional if executed on a machine which does not support the arm and queue instructions.

20. The method of claim 18, further comprising:
flushing thread of control instructions subsequent to the quiesce instruction from an instruction pipeline, upon halting execution of the thread of control.

21. The method of claim 1 wherein the event is caused by another thread of control.

22. The method of claim 1, further comprising:
while the thread of control is halted,
fetching instructions from said thread of control, and allowing the fetched instructions to propagate into an instruction pipeline.

23. The method of claim 22, wherein instructions are fetched into an instruction buffer.

24. The method of claim 1 wherein the thread of control is executing in a multithreaded environment.

25. The method of claim 24 wherein the environment is further a simultaneous multithreaded environment.

26. The method of claim 1 wherein the thread of control is executing in a multiprocessor environment.

27. The method of claim 1 further comprising the step of:
upon halting execution of the thread of control, setting a timer to time a predetermined time interval, and starting the timer; and
resuming execution of the thread of control upon expiration of a timer.

28. The method of claim 27, further comprising:
stopping the timer if execution of the thread of control is resumed due to observation of the event by the event monitor.

29. The method of claim 1, wherein halting execution of the thread of control results in a reduction of power consumption.

30. The method of claim 21 wherein the another thread of controls executing in a different CPU.

31. The method of claim 21 wherein the another thread of controls executing in a different TPU.

32. The method of claim 18 wherein instructions are executed out of order.

33. A system for temporarily halting execution of a thread of control while the thread of control is waiting for an event to occur, comprising:
an event monitor which, by execution of an arm instruction, is armed via identification of an event to be monitored; and
an execution scheduler, responsive to the event monitor, which, upon a request that the thread of control be halted until the event is observed by the event monitor, halts execution of the thread of control if the event has not yet occurred since the event monitor was armed, and which resumes execution of the thread of control upon observation of the event by the event monitor.

34. The system of claim 33 wherein the event to be monitored is identified by at least one memory location to be monitored, and wherein the event comprises a modification to at least one of the identified memory locations.

35. The system of claim 34 wherein the modification comprises a change of state.

36. The system of claim 35 wherein a change of state comprises a change of access state.

37. The system of claim 36 wherein the modification comprises a change of value.

38. The system of claim 37 wherein a change in value is observed as a write to the memory location.

39. The system of claim 34, further comprising:
a working register associated with the thread of control, into which a physical address of the memory location is stored upon arming of the event monitor; and
an indicator associated with the thread of control, the indicator being set to a first state upon arming the event server, causing the event monitor to monitor for the event, and the indicator being set to a second state by the event monitor upon a change to the memory location whose address is recorded in the working register.

40. The system of claim 39, wherein a value is loaded from the identified memory location upon storing the memory location's address in the working register, such that a determination may be made as to whether the memory location's state has changed after arming the event monitor and before halting the thread's execution.

41. The system of claim 33, wherein an executing quiesce instruction halts execution of the thread of control until the identified event is observed.

42. The system of claim 34, wherein a change to the memory location comprises a change of state of the memory location, caused by another thread of control, from shared to exclusive.

43. The system of claim 34, wherein a change to the memory location comprises a write operation to the memory location, observed by monitoring the address on a memory write bus.

44. The system of claim 41, further comprising:
an instruction flusher for flushing thread of control instructions subsequent to the quiesce instruction from an instruction pipeline if the thread of control is halted.

45. The system of claim 41, wherein, while the thread of control is halted, thread of control instructions are fetched and allowed to propagate into the instruction pipeline.

46. The system of claim 33 wherein the thread of control is executing in a multithreaded environment.

47. The system of claim 46 wherein the environment is further a simultaneous multithreaded environment.

48. The system of claim 33, wherein the thread of control is executing in a multiprocessor environment.

49. The system of claim 33 further comprising:
a timer associated with the thread of control such that a timer, upon the halting of its associated thread of control, is set to time a predetermined time interval, and started, wherein execution of the thread of control is resumed upon expiration of a timer; and wherein the timer is stopped if execution of the thread of control is resumed due to observation of the event by the event monitor.

50. An electronic circuit for temporarily halting execution of a thread of control while the thread of control is waiting for an event to occur, comprising:
an event monitor circuit, for monitoring, upon the execution of an arm instruction, for at least one event identified by the thread of control;
a quiesce logic circuit, which, responsive to the event monitor circuit and to a request from the thread of control to quiesce, temporarily halts execution of the thread of control, and which, responsive to the event monitor circuit upon observation of at least one identified event, resumes execution of the halted thread of control.

51. The electronic circuit of claim 50, further comprising:
a flushing circuit which, upon halting execution of the thread of control, flushes the thread's instructions from an instruction pipeline subsequent to the request to quiesce.

52. The electronic circuit of claim 50, further comprising:
a mapper selection circuit which selects, for mapping, at least one instruction in at least one instruction buffer associated with at least one non-quiescing thread of control.

53. The electronic circuit of claim 50, further comprising:
a fetch selection circuit which selects, for fetching, at least one program counter associated with at least one non-quiescing thread of control.

54. The electronic circuit of claim 50, further comprising:
a timer circuit associated with the thread of control, wherein, upon the halting of its associated thread of control, the timer circuit is set to time a predetermined time interval and started, wherein the quiesce logic circuit, responsive to the timer circuit, resumes execution of the thread of control upon expiration of the interval.

55. A system for temporarily halting execution of a thread of control while the thread of control is waiting for an event to occur, comprising:
event monitoring means;
arming means for arming the event monitoring means by identification of at least one event to be monitored, upon the execution of an arm instruction;
requesting means for requesting that the thread of control be halted until any such identified event is observed by the event monitoring means; and
halting means for halting the thread of control responsive to the requesting means, wherein if execution of the thread of control is halted, execution of the thread of control is resumed subsequent to observation of an identified event by the event monitoring means.

56. A system for temporarily halting execution of a thread of control while the thread of control is waiting for an event to occur, comprising:
an event monitor which is armed via identification of an event to be monitored, the event to be monitored being identified by at least one memory location to be monitored, and the event comprising a modification to at least one of the identified memory locations;
an execution scheduler, responsive to the event monitor, which, upon a request that the thread of control be halted until the event is observed by the event monitor, halts execution of the thread of control if the event has not yet occurred since the event monitor was armed, and which resumes execution of the thread of control upon observation of the event by the event monitor;
a working register associated with the thread of control, into which a physical address of the memory location is stored upon arming of the event monitor; and
an indicator associated with the thread of control, the indicator being set to a first state upon arming the event server, causing the event monitor to monitor for the event, and the indicator being set to a second state by the event monitor upon a change to the memory location whose address is recorded in the working register.

57. The system of claim 56, wherein a value is loaded from the identified memory location upon storing the memory location's address in the working register, such that a determination may be made as to whether the memory location's state has changed after arming the event monitor and before halting the thread's execution.

58. A method for temporarily halting execution of a thread of control while the thread of control is waiting for an event to occur, comprising:
identifying at least one event to be monitored;
executing an arm instruction to arm an event monitor to monitor for any such identified event;
requesting that the thread of control be halted until any such identified event is observed by the event monitor; and
if execution of the thread of control has been halted,
monitoring, by the event monitor, for an identified event; and
resuming execution of the thread of control subsequent to observation of an identified event by the event monitor.

59. A system for temporarily halting execution of a thread of control while the thread of control is waiting for an event to occur, comprising:
an event monitor which is armed via execution of an arm instruction to monitor for an identified event; and
an execution scheduler, responsive to the event monitor, which, upon a request that the thread of control be halted until the event is observed by the event monitor, halts execution of the thread of control if the event has not yet occurred since the event monitor was armed, and which resumes execution of the thread of control upon observation of the event by the event monitor.

60. A system for temporarily halting execution of a thread of control while the thread of control is waiting for an event to occur, comprising:
event monitoring means;
arming means for arming, upon the execution of an arm instruction the event, said monitoring means for monitoring at least one identified event;
requesting means for requesting that the thread of control be halted until any such identified event is observed by the event monitoring means; and
halting means for halting the thread of control responsive to the requesting means, wherein if execution of the thread of control is halted, execution of the thread of control is resumed subsequent to observation of an identified event by the event monitoring means.

* * * * *